Nov. 27, 1928.  
M. TIBBETTS  
MOTOR VEHICLE  
Filed March 4, 1926  
1,692,965  
2 Sheets-Sheet 1

INVENTOR  
Milton Tibbetts  
BY Harold E. Stonebraker  
his ATTORNEY

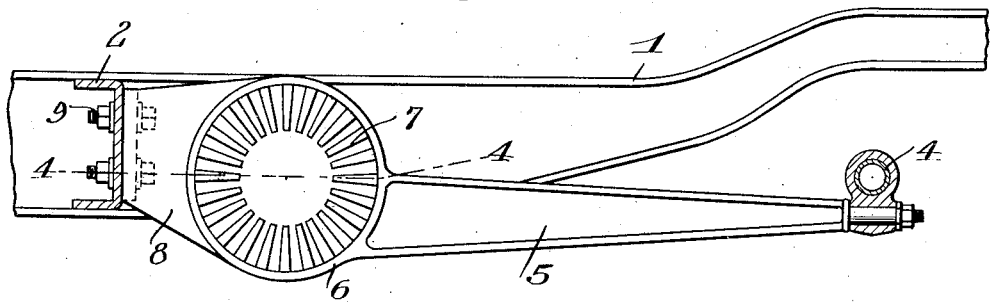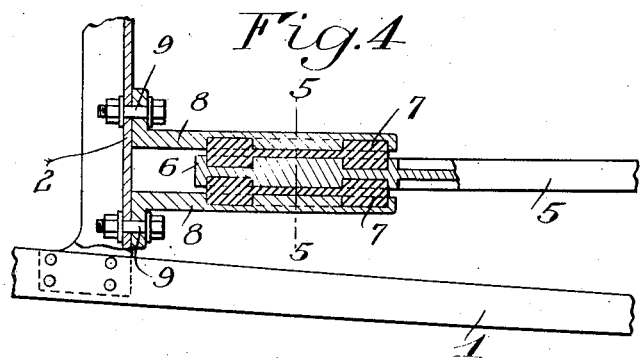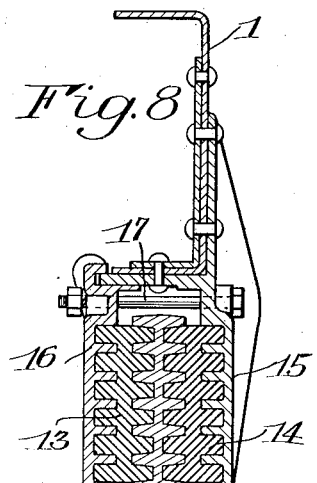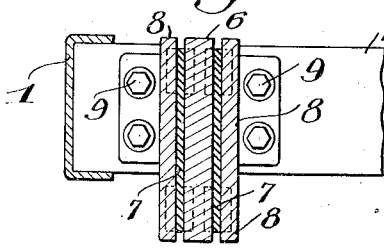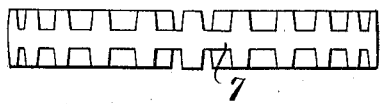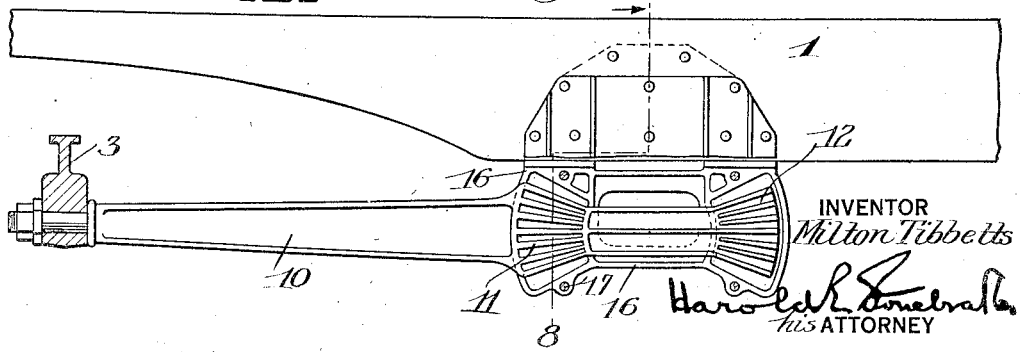

Patented Nov. 27, 1928.

1,692,965

UNITED STATES PATENT OFFICE.

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed March 4, 1926. Serial No. 92,257.

This invention relates to a motor vehicle, and more particularly to the general type of suspension illustrated in Patent No. 1,515,716, November 18, 1924, in which an arm is connected at one end to an axle and at its opposite end to a chassis frame through a rubber block which has a rib and groove connection with the arm and frame and is clamped therebetween, permitting slight relative movement of the frame and arm.

One object of the invention is to afford an arrangement that permits greater flexibility between the connecting arm and frame, in the way of relative movement of said parts sidewise of the frame as for instance when one end of the axle occupies a higher position than the other end with reference to the frame, thus reducing the need of a flexible connection between the connecting arm and axle.

A further purpose of the invention is to afford an arrangement by which the rubber connecting means offers maximum resistance to relative movement of the parts, so as to obtain the greatest possible amount of resisting action and supporting power from a rubber unit of given diameter.

Another object of the invention is to eliminate the necessity of a center bearing or pin between the arm and frame, thus doing away with contact of metallic parts and need for lubrication at this point as well as the undesirable effects from strain on the metal bearing.

In a more particular aspect, the invention is designed to clamp the arm to the frame solely through rubber means, that is to say, without any metal or rigid device directly connecting these parts, the rubber body alone acting to hold the parts in normal relationship and resist relative movements, and to attain this end by a plurality of rubber blocks cooperating with opposite faces of the arm and clamped thereagainst between retainers connected to the frame.

Still an additional purpose of the invention is to provide a structure of the general type mentioned that affords the desired universal flexibility between the connecting arm and frame and which at the same time is so compactly arranged as to occupy a minimum space in a vertical plane, and thus permit maximum ground clearance.

To these and other ends, the invention comprises the construction and arrangement of parts that will appear clearly from the following description, when read in connection with the accompanying drawings, the novel features being pointed out in the claims following the description.

In the drawings:

Figure 3 is a longitudinal vertical sectional view on line 3—3 of Figure 2;

Figure 4 is a horizontal sectional view on line 4—4 of Figure 3;

Figure 5 is a transverse sectional view on line 5—5 of Figure 4;

Figure 6 is an edge view, partly in section, of one of the rubber blocks;

Figure 7 is an enlarged side elevation of the modified arrangement shown at the front of the frame on Figures 1 and 2, and with the outer retainer removed, and Figure 8 is a sectional view on line 8—8 of Figure 7.

Figure 1:
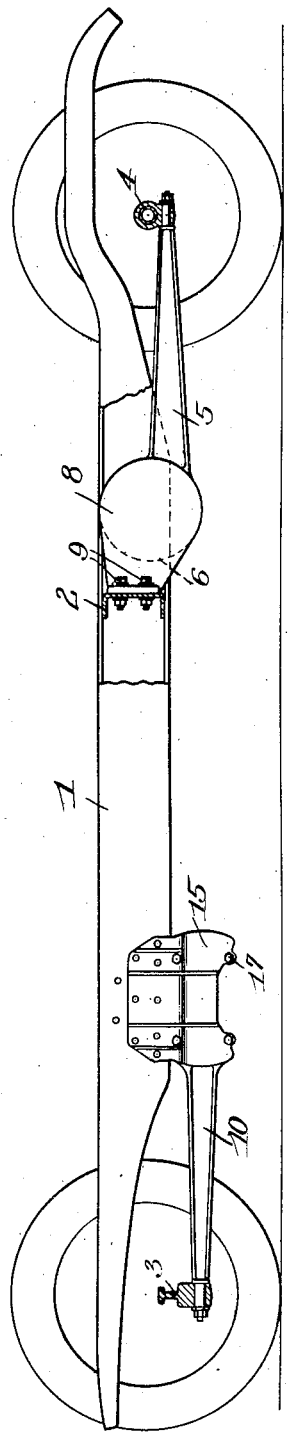
Figure 1 is a side elevation of a motor vehicle frame showing the invention applied thereto, one embodiment being incorporated in connection with the rear axle, and a possible modified arrangement applied to the front axle.

Referring more particularly to the drawings in which like reference numerals refer to corresponding parts in the several views, 1 designates the side members of a motor vehicle frame, 2 is a cross member, while 3 and 4 designate the front and rear axles respectively.

The embodiment of the invention shown as applied to the rear axle, and appearing in detail in Figures 3 to 5 inclusive, includes an arm 5 which may be rigidly or otherwise connected to the axle 4, and is connected to the cross member 2 of the frame in the manner now to be described. At its forward end, the arm 5 is provided with a series of circularly arranged ribs and grooves designated generally at 6 on opposite faces, while 7 designates each of a pair of circular rubber blocks having similar ribs and grooves provided on opposite faces thereof, the blocks 7 being preferably of circular formation. Thus, the forward end of the arm 5 is interposed and locked between the rubber blocks 7 which constitute the only direct supporting means for the arm, and the blocks 7 are held in clamping relation with the arm 5 by suitable retainers or brackets 8 which are rigidly attached to the cross member 2, as shown in Figure 4, by bolts 9.

To assemble the parts, the arm 5 is brought into proper position with the rubber blocks 7 on opposite faces thereof, and the retainers 8 are then held in proper relation to the rubber blocks by suitable clamping means until the bolts 9 can be secured in place. After the retainers 8 are once rigidly attached, they serve through the rubber blocks 7 to hold the arm 5 in supporting relationship to the frame, the rubber blocks 7 permitting such relative turning or twisting movements between the frame and arm 5 as are necessary to compensate for relative movement of the axle. In the patented structure hereinbefore mentioned, a center bearing pin is used between the arm and frame, and with the present invention, this pin is unnecessary. This results in making lubrication at this point unnecessary by doing away with metal contact between the arm and frame, and makes it possible for the arm to twist or move laterally without damaging or straining any parts, as is the case where a center connecting pin is employed.

Where a plurality of circular rubber blocks are employed on both sides of the arm, as in the arrangement just described, considerable lateral flexibility is permitted, but this is limited by the diameter of the rubber blocks and retainers. Where still greater flexibility is desired, or where more ground clearance is desired, the modified arrangement illustrated in Figures 7 and 8 may be used.

Figure 2:
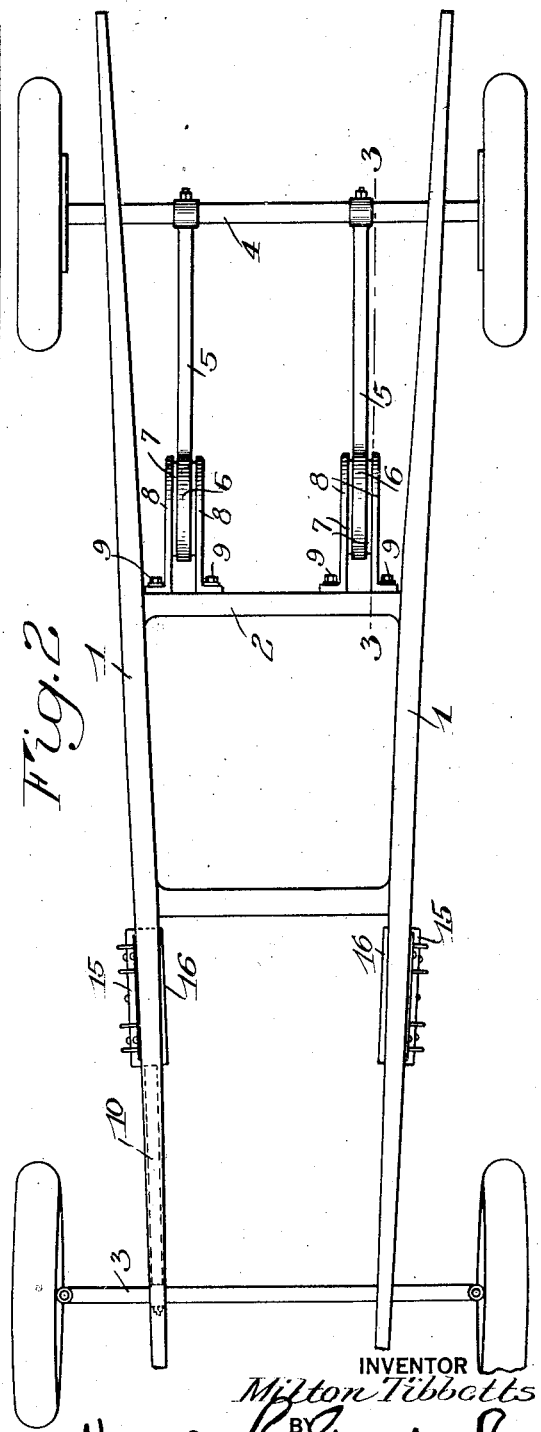
Figure 2 is a plan view of the same.

In this form, which is illustrated in Figures 1 and 2 as applied to the front of the frame, 10 is the arm rigidly or otherwise connected to the axle 3 and provided at its inner end with segmental portions 11 and 12, provided on opposite faces thereof with radial ribs and grooves as already described. Arranged on both sides of the segmental portions 11 and 12 are segmental rubber blocks 13 and 14 which have corresponding ribs and grooves, arranged radially to cooperate with the ribs and grooves on segmental portions 11 and 12. The rubber blocks are held in clamping relation to the adjacent segmental portions of the arm 10 by means of a fixed retainer or bracket 15, riveted or otherwise permanently attached beneath the side member 1 of the frame, and a removable retainer or bracket 16, see Figure 8, engaging the outer rubber blocks 13 and held thereagainst by bolts 17 located above and below the rubber blocks respectively.

In the arrangement just described, the segmental portions and blocks are disposed on opposite sides of a vertical plane, affording maximum relative sidewise movement between the frame and connecting arm about an axis extending longitudinally of the frame, and by disposing the segmental portions and rubber blocks on opposite sides of a horizontal plane, that is, above and below the center of the arm, maximum relative sidewise movement would be permitted about a vertical axis. In either case, it will be understood that the action generally is the same as that already described with reference to Figures 3 to 5 inclusive, the difference being that the circular units of the form first described are cut away, resulting in segmental units rather than circular units. The smaller these segments are, the greater the lateral flexibility, and the greater the ground clearance when the segmental portions are arranged as shown in Figures 7 and 8, which permits locating the inner end of the connecting arm beneath the side member of the frame.

The term "inner face" of the connecting arm, as used in the claims, is intended to refer to that face of the arm which lies nearer to the center line of the vehicle, while the "outer face" is the opposite side or face farther away from the center line. By the "inner face" of a rubber block is meant that face in contact with the connecting arm, and the "outer face" of the rubber block is the opposite face, farther away from the connecting arm and in contact with the retainers 8 or 15 or 16.

While the invention has been described with reference to certain details of construction, it is not confined to the precise forms and arrangements shown, and this application is intended to cover such other modifications or departures as may come within the underlying purposes of the invention or the scope of the following claims.

I claim:

1. In a motor vehicle, the combination with an arm connected to an axle, of rubber blocks having groove and rib connection with opposite faces of the arm, a frame, and retainers connected to the frame and cooperating with the rubber blocks whereby said rubber blocks clamp and support the arm.

2. In a motor vehicle, the combination with an arm having one end connected to an axle, of a plurality of rubber blocks, each having radially arranged grooves and ribs on their inner faces cooperating with similar grooves and ribs on opposite faces of the other end of the arm, a frame, and retainers secured to the frame and acting to hold the rubber blocks in engagement with the arm.

3. In a motor vehicle, the combination with an arm having one end connected to an axle, of a plurality of rubber blocks each having radially arranged grooves and ribs on opposite faces, their inner faces engaging similar grooves and ribs on opposite faces of the arm, a frame, and retainers secured to the frame having grooves and ribs engaging the outer faces of the rubber blocks and acting to hold said blocks against the arm.

4. In a motor vehicle, the combination with an arm having one end connected to an axle and its other end provided on both its inner and outer faces with oppositely arranged block engaging segmental portions having radial grooves and ribs, of segmental rubber blocks having similar grooves and ribs on opposite faces, the inner faces of the blocks engaging said segmental portions, a frame, and retainers secured to the frame and provided with grooves and ribs for engagement with the outer faces of said segmental rubber blocks.

5. In a motor vehicle, the combination with a frame including a side member, of an arm having one end connected to an axle and its other end provided on both its inner and outer faces with oppositely arranged block engaging segmental portions having radial grooves and ribs, of segmental rubber blocks having similar grooves and ribs on opposite faces, the inner faces of the blocks engaging said segmental portions, and retainers located beneath the side member and provided with grooves and ribs for engagement with the outer faces of said segmental rubber blocks.

In witness whereof, I have hereunto signed my name.

MILTON TIBBETTS.